United States Patent [19]

Kyriakis

[11] Patent Number: 5,041,736

[45] Date of Patent: Aug. 20, 1991

[54] APPARATUS FOR MONITORING A PRODUCT IN A HOSTILE ENVIRONMENT

[75] Inventor: John Kyriakis, London, England

[73] Assignee: Beta Instrument Company Ltd., United Kingdom

[21] Appl. No.: 549,567

[22] Filed: Jul. 9, 1990

[30] Foreign Application Priority Data

Jul. 7, 1989 [GB] United Kingdom ............... 8915617

[51] Int. Cl.⁵ .................................. G01N 21/86
[52] U.S. Cl. ............................ 250/560; 356/386
[58] Field of Search ............. 250/560, 561, 562, 369, 250/571, 572, 341; 356/430, 431, 386

[56] References Cited

U.S. PATENT DOCUMENTS

| 3,796,874 | 3/1974 | Roller et al. | 250/369 |
| 3,806,253 | 4/1974 | Denton | 356/386 |
| 4,563,095 | 1/1986 | Puffer | 250/562 |

Primary Examiner—David C. Nelms
Assistant Examiner—K. Shami
Attorney, Agent, or Firm—Griffin Branigan & Butler

[57] ABSTRACT

A cable monitoring system is arranged such that a light source is disposed within a chamber containing the hostile environment through which the cable is moving, and a light detector determines the condition of the cable by sensing the amount/position of light not occluded by the cable and passing through a window in the chamber to its exterior where said detector is disposed.

3 Claims, 2 Drawing Sheets

5,041,736

APPARATUS FOR MONITORING A PRODUCT IN A HOSTILE ENVIRONMENT

FIELD OF THE INVENTION

The present invention relates to a method and apparatus for monitoring a travelling or stationary object in a hostile enviroment.

BACKGROUND OF THE INVENTION

High voltage cables or conductors for installation in cable ducts or on the sea bed are normally coated with a plastics material by an extrusion process.

In such a process it is a desired requirement that the cable dimesion and position in the extrusion run be monitored constantly in order that the final product conforms to manufacturers specifications. In some instances a special semi-conductor insulant is applied in the extrusion process known in the art as a vulcanizing process, in which the insulation has to be applied under pressure by means of steam or nitrogen gas, at an elevated temperature.

Due to this and the hostile environment in which curing of the coating takes place a non-contact dimensional measurement technique is required.

Present known techniques are plagued with problems, in particular the difficulty of obtaining accurate measurements in the absence of direct contact due to the presence of contamination between the object being measured and the remote measuring instrumentation.

SUMMARY OF THE INVENTION

It is an object of the present invention to provide a non-contact measuring technique which is free of the disadvantages of the prior art.

According to one aspect of the invention there is provided a monitoring system for monitoring a coated cable continuously moving through a hostile environment comprising a sealed containment chamber for the hostile environment, an inspection window in the chamber for viewing the cable passing therethrough, a source of radiation within the chamber and positioned such that the cable is between the inspection window and said raiation source viewable through said inspection window, and means for monitoring the radiation emitted from said inspection window, being the radiation from said source less that obscured by said cable, thereby to determine the dimension and position of the cable within the chamber.

The source of radiation may be infra-red radiation provided by a heating element.

With arrangement above dimensional and positional measurement is enhanced and is not affected by adverse conditions within the containment chamber, or by contaminants developing in the inspection window which otherwise have the effect of distorting the measurements obtained.

BRIEF DESCRIPTION OF THE DRAWINGS

The invention will be described by way of example with reference to the accompanying drawings wherein.

BEST MODE OF CARRYING OUT THE INVENTION

Figure 1:
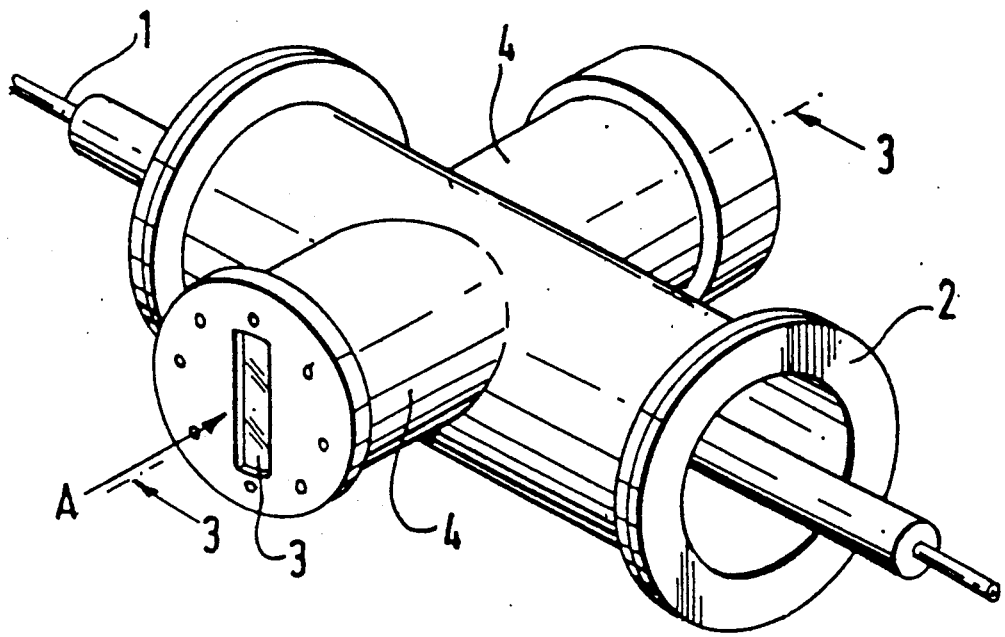
FIG. 1 is a perspective view of a section of an extrusion line for coating a high voltage cable.
Figure 2:
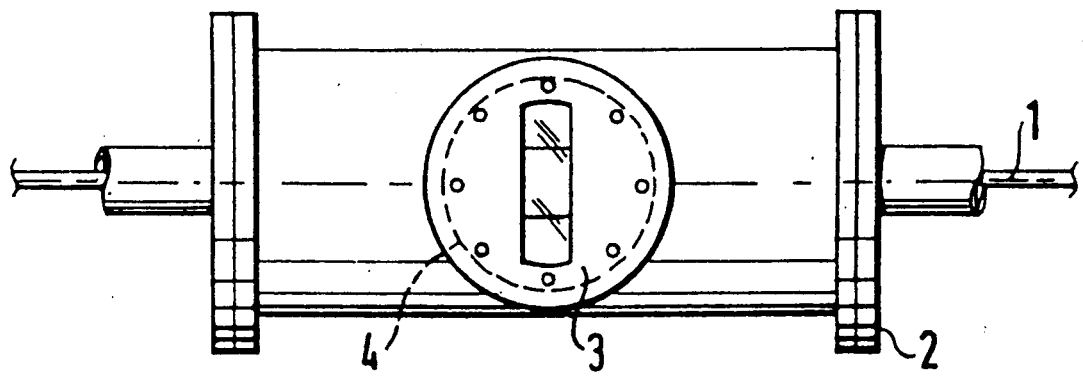
FIG. 2 is a view looking along the line A of FIG. 1.
Figure 3:
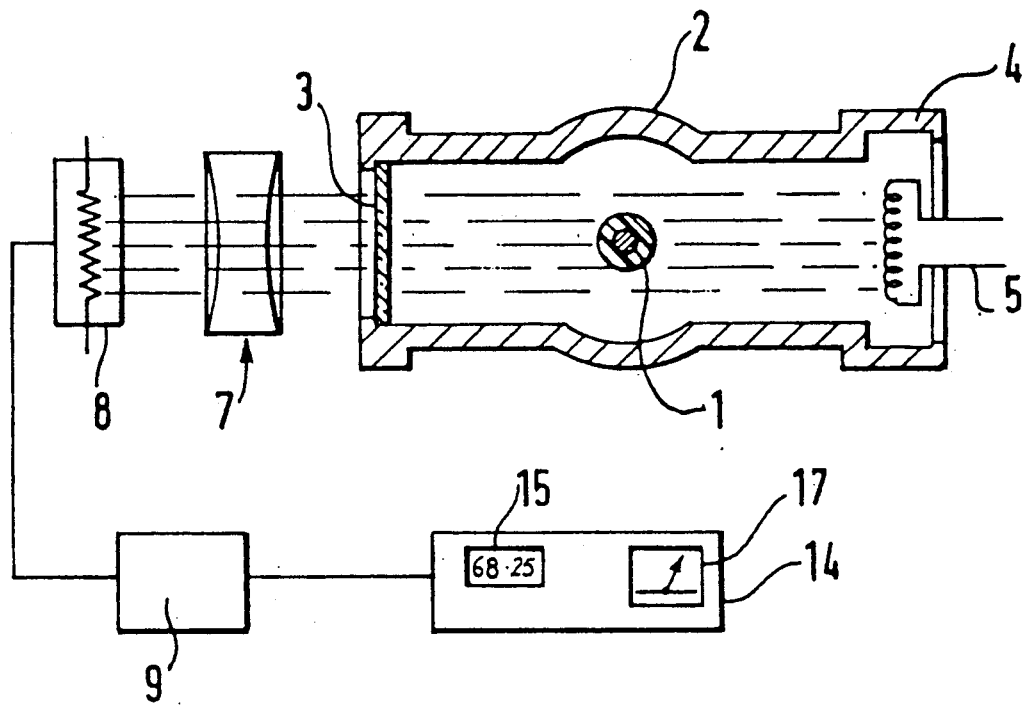
FIG. 3. is a cross sectional view along the line 33 of FIG. 1 and wherein a measuring circuit is depicted for obtaining the required dimensions of the cable.

In FIGS. 1 and 2 a cable 1 is shown passing through a pressurisation tube 2 of an extrusion line in which a curing process may take place such as vulcanisation, the cable in this case being an insulated electrical cable provided with a semi-conductor coating.

To regulate the process and maintain the cable 1 within manufacturers specification, it is necessary to measure the position as well as the diameter of the cable within the tube 2.

In order to do this inspection window 3 is provided by welding a secondary tube 4 at 90° to the tube 2 thereby to permit optical viewing of the product through the window 3.

A radiation source 5 is positioned with the tube 2 with the cable 1 being between the radiation source and the inspection window.

In the example shown the radiation source is a heating element which has the advantage that it may be installed within the containment chamber. Alternatively the radiation source could be provided by an ordinary incandescent lamp positioned outside the containment chamber.

Observation through the inspection window with the arrangement shown, and assuming the heating element is glowing red, the glowing filament will be observed above and beneath the cable 1 and obscured in the centre by the interposition of the cable 1.

This is imaged by a lens assembly 7 and focused onto a charged coupled device 8 having an array of some 2,000 pixels.

Figure 4:
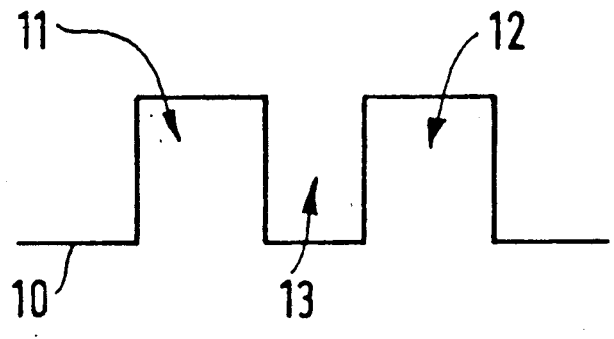
FIG. 4 shows a typical wave form output obtained by the measuring system shown in FIG. 3.

A circuit board 9 connected to the charge coupled device 8 has the capability of electronically scanning the charged coupled device 8 so that a square wave 10 shown in FIG. 4 is obtained.

Peaks 11 and 12 in the square wave output are representative of the output radiation seen above and beneath the cable respectively, while the centre dark portion 13 is the shadow represented by the cable being proportional to the dimension of the cable as viewed by the cable 1. The ratio of the area of peaks 11 and 12 determines the position of the cable 1 within the tube 2 in a vertical mode.

The square wave 10 is processed by an indicator unit 14 and the cable size can be displayed on digital display 15 and the position of the cable on the meter 17.

In order to prevent steam or water droplets and the like from settling onto glass window 3, heating of the tube may be performed as disclosed in our pending European application No. 87303611.5 which is incorporated herein by reference. However it is to be pointed out that due to the nature of the optical measurement disclosed herein, when the cable 1 is imaged by the lens systems 7 onto charged coupled device 8, any water droplets, steam and the like, which have formed on the window 3 will be out of focus and therefore not likely to impair accuracy of measurement. Thus the measuring capabilities of the system are much enhanced and operation is considerably improved in adverse condition.

What is claimed is :

1. A monitoring system for monitoring a coated cable continuously moving through a hostile environment comprising a sealed containment chamber for the hostile environment, an inspection window in the chamber for viewing the cable passing therethrough, a source of radiation within the chamber and positioned such that the cable is between the inspection window and said radiation source viewable through said inspection window, and means for monitoring the radiation emitted from said inspection window, being the radiation from said source less that obscured by said cable, thereby to determine the dimension and position of the cable within the chamber.

2. A system as claimed in claim 1 wherein said source of radiation is infra-red provided by a heating element, positioned inside said chamber.

3. A system as claimed in any preceding claim wherein said monitoring means includes imaging means for providing a square waveform output representative of the radiation received from said source less that excluded by said interposed cable, and means for determining the dimension and position of said cable from said waveform.

* * * * *

REEXAMINATION CERTIFICATE (2091st)
United States Patent [19]
Kyriakis

[11] B1 5,041,736
[45] Certificate Issued  Sep. 14, 1993

[54] APPARATUS FOR MONITORING A PRODUCT IN A HOSTILE ENVIRONMENT

[75] Inventor: John Kyriakis, London, England

[73] Assignee: Beta Instrument Company Ltd., High Wycombe, United Kingdom

Reexamination Request:
No. 90/002,824, Sep. 3, 1992

Reexamination Certificate for:
Patent No.: 5,041,736
Issued: Aug. 20, 1991
Appl. No.: 549,567
Filed: Jul. 9, 1990

[30] Foreign Application Priority Data
Jul. 7, 1989 [GB] United Kingdom .................. 8915617

[51] Int. Cl.⁵ .......................................... G01N 21/86
[52] U.S. Cl. ..................................... 250/560; 356/386

*Primary Examiner*—Edward P. Westin

[57] ABSTRACT

A cable monitoring system is arranged such that a light source is disposed within a chamber containing the hostile environment through which the cable is moving, and a light detector determines the condition of the cable by sensing the amount/position of light not occluded by the cable and passing through a window in the chamber to its exterior where said detector is disposed.

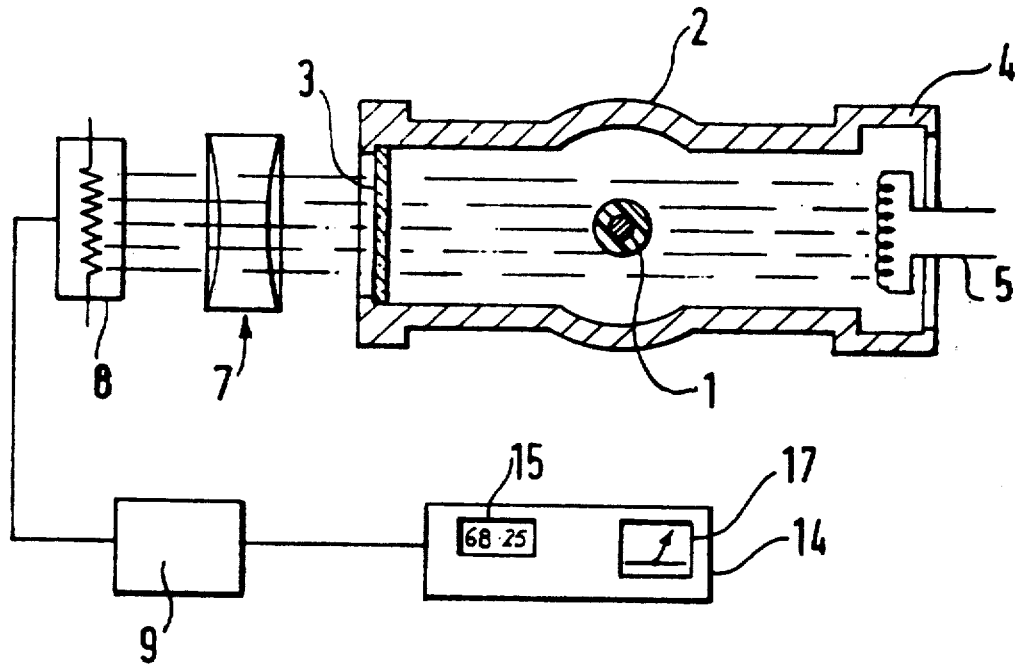

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3 are cancelled.

* * * * *